United States Patent [19]
Tovar

[11] Patent Number: 5,314,226
[45] Date of Patent: May 24, 1994

[54] VEHICLE SUNSHIELD

[76] Inventor: Juan P. Tovar, 405 Broadway, Bayonne, N.J. 07002

[21] Appl. No.: 8,146

[22] Filed: Jan. 25, 1993

[51] Int. Cl.$^5$ .............................................. B60J 3/02
[52] U.S. Cl. ................... 296/97.7; 296/97.8; 160/370.2 R
[58] Field of Search ...................... 296/97.7, 97.8; 160/370.2; 248/205.5, 205.8

[56] References Cited

U.S. PATENT DOCUMENTS

| | | | |
|---|---|---|---|
| 2,345,106 | 3/1944 | Erps | 296/97.8 |
| 3,003,812 | 10/1961 | Haugland | 296/97.7 |
| 4,202,396 | 5/1980 | Levy | 296/97.1 |
| 4,497,515 | 2/1985 | Appelson | 296/141 |
| 4,588,223 | 5/1986 | Ledenyi | 296/24.1 |
| 4,758,042 | 7/1988 | Zin | 296/97.7 |
| 4,836,263 | 6/1989 | Ament | 160/68 |
| 4,883,304 | 11/1989 | Elliot | 296/97.8 |
| 4,932,710 | 6/1990 | Chen | 296/97.8 |
| 4,932,711 | 6/1990 | Goebel | 296/97.7 |
| 5,176,357 | 1/1993 | Hobart | 248/205.8 |

*Primary Examiner*—Robert R. Song
*Attorney, Agent, or Firm*—Norman B. Rainer

[57] ABSTRACT

A sunshield device for use in a parked vehicle to block sunlight from entering through the vehicle's windows is made of an assemblage of elongated panels. The panels are hingedly interconnected in a vertical array whereby the assemblage can be accordion folded to a compact storage state. The uppermost panel of the assemblage is provided with a suction cup adapted to attach to the window of the vehicle. The suction cup is provided with a mechanism extending through the uppermost panel for achieving release of the suction cup from the window.

4 Claims, 2 Drawing Sheets

VEHICLE SUNSHIELD

BACKGROUND OF THE INVENTION

1. Field of the Invention

This invention relates to sun blocking devices, and more particularly concerns a folding, retractable sunshield adapted for use in a parked vehicle to block sunlight from entering through the vehicle's windows.

2. Description of the Prior Art

Numerous vehicular sun blocking devices have been disclosed in the prior art. Sunlight entering the vehicle heats the interior and causes degradation of the seats and other components of the interior of the vehicle. Various sunshade devices have been employed to prevent sunlight from entering a parked vehicle, said devices being designed for use either upon the exterior or within the interior of the vehicle. The exterior devices may be comprised of an arcuate semi-transparent member mounted above the upper portion of the front window, thus filtering and shading part of the interior of the vehicle only when the sun is at the higher part of its orbit. Other exterior shade means may comprise a compliant tarp or covering which may cover the windows only or the entire vehicle.

The interior shade devices generally are either curtains, venetian blinds, or roll-up shades which are permanently or semi-permanently mounted upon the windows or window frames of the vehicle. For example, U.S. Pat. No. 3,003,812 to Haugland discloses a multi-pleated panel capable of folding downwardly accordion-style to a compact, horizontally elongated storage state. This design comprises a plurality of moving parts, lending itself to relatively expensive manufacture, and would more than likely require the use of two hands for raising or lowering. It is most preferable to have a shade which may be easily deployed with one hand, particularly for use interiorly of the rear window of the automobile. The other hand may then be used for supporting the user's weight while reaching toward the shade.

U.S. Pat. No. 4,758,042 to Liu discloses a sunshade having a plurality of horizontally disposed accordion folding panels which are held upon the window by means of suction cups. A coiled spring plate mounted upon a handle on the top panel of the shade achieves folding of the shade. This shade design is disposed at the bottom of the window while not in use, thereby obstructing visibility through the lower portion of the window. Another spring-urged shade is disclosed in U.S. Pat. No. 4,932,711 to Goebel. The Goebel device is comprised of a plurality of accordion pleated fabric panels having apertures penetrated by spring urged strings which have upper extremities fixedly associated with a top panel, and lower extremities associated with a shaft urged to rotate by a spiral wound spring. A suction cup is used to maintain the shade in the upright position. A similar device with yet greater complexity is disclosed in U.S. Pat. No. 2,345,106 to Erps. The Erps shade requires an elaborate mechanism which may not be adaptable to existing vehicle doors, and would have limited applicability to front and rear windshields which are generally curved.

U.S. Pat. No. 4,932,710 to Chen discloses a venetian blind device adaptable to the side windows of a vehicle. The venetian blind is not amenable to low cost manufacture, is not easily adaptable to front and rear curved or sloping windshields, and would limit visibility through the upper portion of the window when raised.

Recent developments have been made in shade devices which are manually deployed and removed by the user. U.S. Pat. No. 4,883,304 to Elliot discloses a sun shield constructed of lightweight flexible fabric having vertical stiffening members at the center and lateral extremities. Velcro fasteners are used to maintain the shade in deployed position. U.S. Pat. No. 4,202,396 to Levy discloses a sun shield having a plurality of accordion folded vertical panels, some of which have suction cups at the top which secure the shield to the windshield when deployed. These devices must be manually folded and unfolded, using two hands, and stored elsewhere from the site of use when not in use.

It is accordingly an object of the present invention to provide a conveniently usable sunshade for a vehicle.

It is another object of this invention to provide a sunshade as in the foregoing object which may be easily deployed and retracted with one hand.

It is a further object of the present invention to provide a sunshade of the aforesaid nature which is easily stored in a ready position while not in use.

It is yet another object of this invention to provide a sunshade of the aforesaid nature which may be easily adapted to fit a myriad of automobile windows.

It is still another object of the present invention to provide a sunshade of the aforesaid nature which is durable, compact, easily installed, efficient, and amenable to low cost manufacture.

These and other beneficial objects and advantages will be apparent from the following description.

SUMMARY OF THE INVENTION

The above and other beneficial objects and advantages are accomplished in accordance with the present invention by a sunshade adapted for use in a vehicle having windows having upper and lower extremities and fixed structure disposed above and below said upper and lower extremities, respectively, said sunshade comprised of:

a) a plurality of panels of elongated, substantially rectangular configuration, each panel having inner and outer surfaces and upper, lower and side edges, each lower edge hingedly associated with the upper edge of the next adjacent panel, thereby disposing said panels in a vertical array bounded by an uppermost and a lowermost panel, said uppermost panel having at least one mounting aperture communicating between said inner and outer surfaces, said lowermost panel having means for releasible attachment to said fixed structure below a vehicle window, said panels adapted to stack with vertical travel in an accordion-folded storage state disposing said inner and outer surfaces in alternating overlying juxtaposition, b) at least one suction cup associated with said uppermost panel and having a suction surface of circular perimeter outwardly directed from said outer surface, a stem adapted to penetrate said mounting aperture, and release means for causing said suction surface to release from engagement with said window, said release means penetrating said panel and terminating in a distal extremity spaced apart from the inner surface of said panel, and c) strapping means fixedly associated with said lowermost panel and adapted to be wrapped around said stacked panels, said strapping means having fastening means adapted to secure said panels, whereby,
a) the sunshade may be deployed from said storage state by releasing said fastening means, lifting said uppermost panel, and pressing said suction surface against said window, and
b) the shade may be returned to its storage state by releasing said suction surface from said window, folding said panels downwardly in accordion fashion to form a compact stack, and wrapping said strapping means around said stack.

In an alternative embodiment, the shade may be attached at the lowermost panel to the lower extremity of said window by at least one suction cup arrangement similar to those used to attach the uppermost panel to the upper extremity of the window. Upon removal of the shade from the window, the shade may be conveniently stored upon the dashboard or rear deck of the vehicle, or elsewhere in the vehicle.

In a preferred embodiment, the shade may be constructed from a plurality of independent panels fabricated from sheet plastic or paperboard. The panels may be hingedly fastened by compliant fabric adhesive tape or hinges molded into the plastic panels. Alternatively, the shade may be constructed from a single sheet of cardboard and molded or embossed along bifurcating lines to create hinges between panel sections.

The shades may be trimmed along their side edges to adapt the shade to fit the shape of the vehicle window. In alternative embodiments, the suction cups associated with the uppermost and lowermost panels may be replaced by other fastening means such as snaps, magnets, or VELCRO hook and loop fastening material.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Referring to FIGS. 1–4, an embodiment of the shade of the present invention is shown comprised of a plurality of panels 10 of elongated rectangular contour, each panel having inner and outer surfaces 11 and 12, respectively, and upper, lower and side edges 13, 14 and 15, respectively. In the illustrated embodiment, the panels are all part of a single monolithic sheet which has been folded to produce the separate panels 10. Each fold line 16 represents hinge means joining the lower edge of one panel to the upper edge of the next lower panel. In such embodiment, the starting monolithic sheet may be comprised of cardboard, corrugated paper laminate, or thermoplastic polymer. The thickness of the panels may range from about $\frac{1}{8}$" to $\frac{1}{4}$", and the panels should be sufficiently rigid as to be substantially non-sagging when extending horizontally with the plane of the panel vertically oriented. In other embodiments, the panels may each be separate entities interconnected by hinge means.

Figure 1:
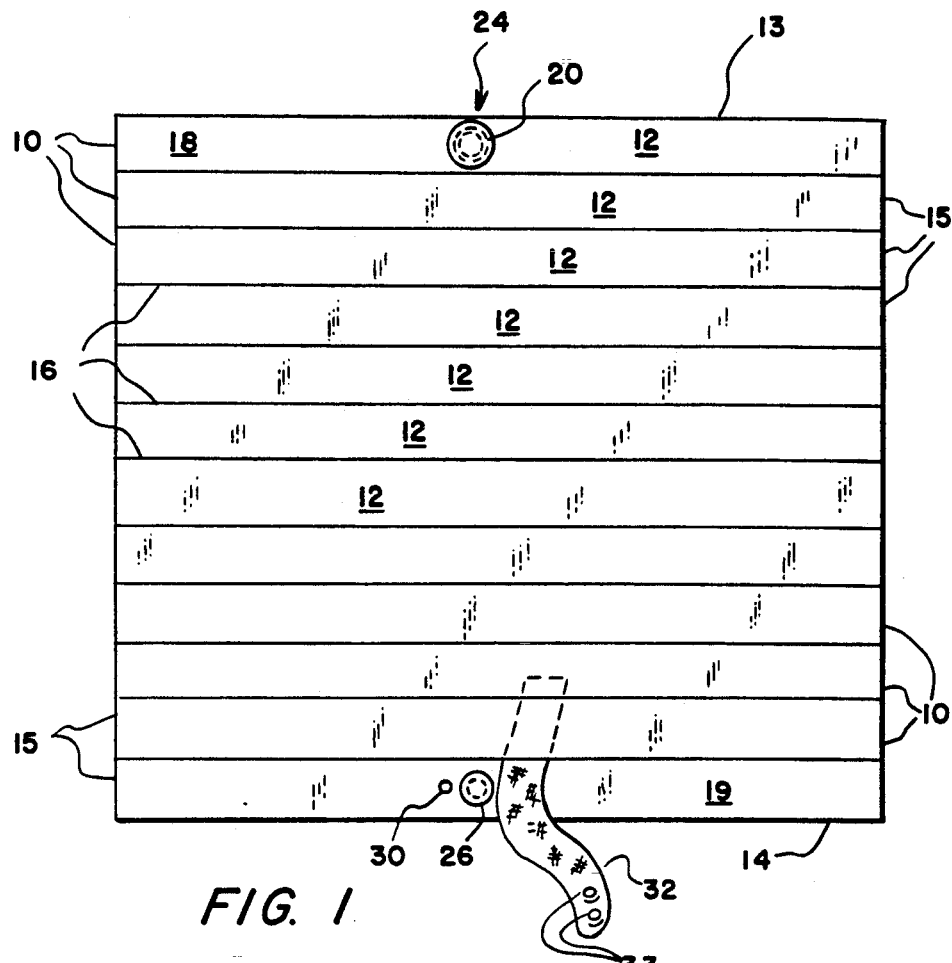
FIG. 1 is a front view of an embodiment of the shade of the present invention in its deployed position.

The panels may typically have a width, measured orthogonally between said upper and lower edges, of between about 2 and 5 inches and a length measured between said side edges, of between about 15 and 40 inches. The lengths of the panels may be equal, whereby the front view of the fully deployed shade, as seen in FIG. 1, is rectangular. In other embodiments, however, the lengths of the panels may diminish step-wise in ascending order, whereby, the front view of the deployed shade will resemble a truncated isoiles triangle. Such configuration may be found to be a better fit for certain shapes of automobile windows. In certain embodiments, the material of construction of the shade is such as to easily enable the user to trim the side edges of the panels so as to better accommodate a particular window.

Figure 2:
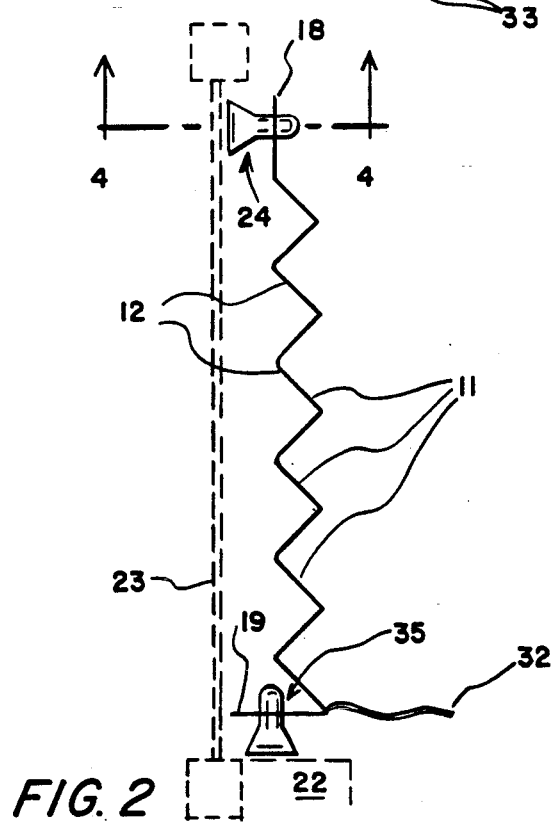
FIG. 2 is a side view of the embodiment of FIG. 1 shown in functional association with a rear window of an automobile.
Figure 3:
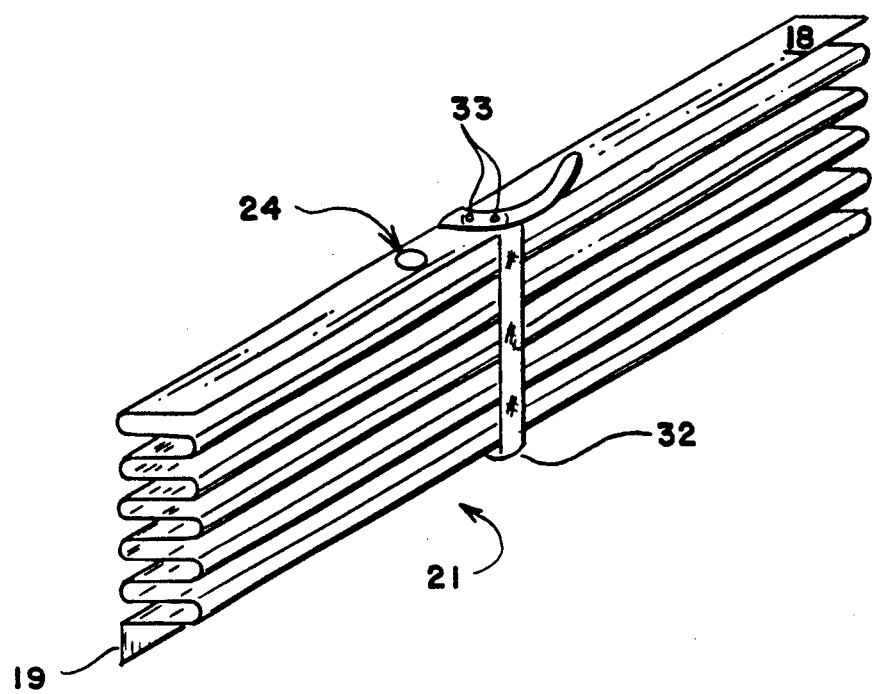
FIG. 3 is a perspective view of the embodiment of FIG. 1 shown in its folded, storage state.
Figure 4:
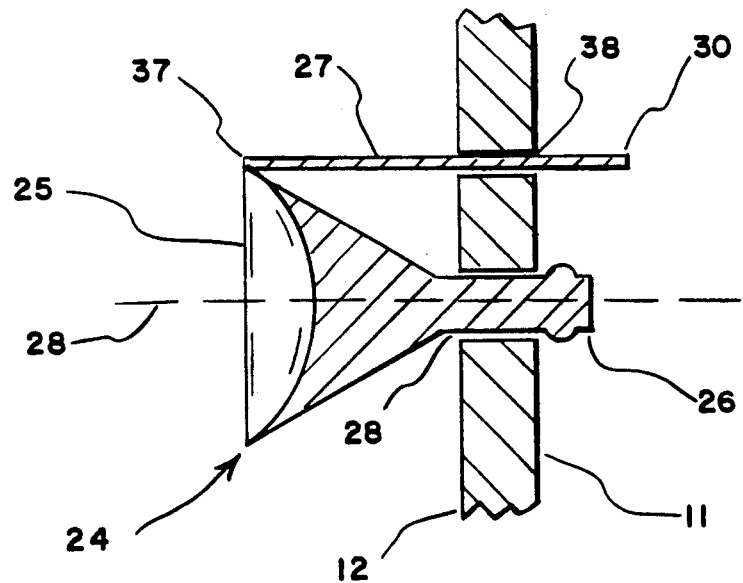
FIG. 4 is an enlarged sectional view taken upon the line 4—4 of FIG. 2.

The shade is comprised of between about 8 and 20 of said panels 10. The manner of interengagement of the panels 10, as by fold line 16, in such as to cause the panels to fold upon themselves in accordion-style alternating back-and-forth manner. In such manner of folding, as seen in FIGS. 2 and 3, adjacent inner surfaces are in contact, and adjacent outer surfaces are in contact. This produces a compact stack 21 which represents the storage state of the shade.

The shade is particularly adapted to use in a disposition wherein the direction of elongation of the panels is horizontal, and the plurality of panels is disposed in a vertical array. In such manner of deployment, the shade may be further characterized in having uppermost and lowermost panels, 18 and 19, respectively.

Uppermost panel 18 of the exemplified embodiment is shown having mounting aperture 20 communicating between said inner and outer surfaces. A suction cup 24 having an axis of symmetry 28 is held by mounting surface 20. Each suction cup is comprised of suction surface 25 bounded by circular perimeter 37 and outwardly directed from outer surface 12, and a stem 26 adapted to penetrate aperture 20. Release means in the form of elongated release tab 27, emerges from perimeter 37 as a continuous integral extension of suction cup 24, extends through control aperture 38 adjacent aperture 20 and parallel thereto and terminates in distal extremity 30 spaced apart from inner surface 11 of uppermost panel 18. Pulling force exerted on tab 27 releases suction surface 25 from attachment to a window. Although the exemplified embodiment of uppermost panel 18 employs one suction cup, the number can vary between about 1 and 3, depending upon the size and total weight of the shade.

Lowermost panel 19 is shown equipped with a suction cup 35 similar to that employed in uppermost panel 18. The function of suction cup 35 is to enable panel 19 to be releasibly attached to either the lower extremity of window 23, or the fixed structure 22 adjacent the lower extremity of said window.

Strapping means in the form of compliant belt 32 is shown penetratively secured by fold line 16 associated with lowermost panel 19, and positioned approximately mid-length thereof. Fastening means in the form of snap fasteners 33 secure belt 32 upon itself. In such manner, belt 32 embraces the stack of panels in its storage state, as shown in FIG. 3, enabling the shade to be easily removed to a place of storage, or permitting the shade to remain installed upon the vehicle, but in a small, neat configuration. It should be noted that the exemplified particular strapping means permits lowermost panel 19 to remain deployed in orthogonal disposition to the remaining, bundled panels. This feature enables the shade to remain affixed to window 23 or fixed structure 22 while in its compactly folded, storage state. Such manner of storage facilitates rapid redeployment of the shade.

Because of the curvature and large size of many front and rear windows of automobiles, it is generally desirable to employ two of the sunshield devices of the present invention, each of a length approximately half the length of the associated window. Such expedient enables the sunshield devices to remain of small enough size to be manipulated with one hand, and make a more contoured fit with the window.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A sunshade adapted for use in a vehicle having windows having upper and lower extremities and fixed structure disposed above and below said upper and lower extremities, respectively, said sunshade comprised of:
   a) a plurality of panels of elongated, substantially rectangular configuration fabricated from a single sheet having hinge lines serving to join adjacent panels, each panel having inner and outer surfaces, side edges, and upper and lower boundaries defined by said hinge lines, thereby disposing said panels in a vertical array bounded by an uppermost and a lowermost panel, said uppermost panel having at least one mounting aperture communicating between said inner and outer surfaces, said lowermost panel having means for releasible attachment to said fixed structure below a vehicle window, said panels adapted to stack with vertical travel in an accordion-folded storage state disposing said inner and outer surfaces in alternating overlying juxtaposition,
   b) at least one suction cup associated with said uppermost panel and having a suction surface of circular perimeter outwardly directed from the outer surface of said panel, a stem adapted to penetrate said mounting aperture, and release means for causing said suction surface to release from engagement with said window, said release means penetrating said panel and terminating in a distal extremity spaced apart from the inner surface of said panel,
   c) at least one suction cup associated with said lowermost panel and having a suction surface of circular perimeter outwardly directed from the inner surface of said panel, and release means for causing the release of said suction surface, said release means penetrating said panel and terminating in a distal extremity spaced apart from the outer surface of said panel, and
   d) strapping means fixedly associated with said lowermost panel and adapted to be wrapped around said stacked panels, said strapping means having fastening means adapted to secure said panels, whereby,
   a) the sunshade may be deployed from said storage state by releasing said fastening means, lifting said uppermost panel, and pressing said suction surface against said window, and
   b) the shade may be returned to its storage state by releasing said suction surface from said window, folding said panels downwardly in accordion fashion to form a compact stack, and wrapping said strapping means around said stack.

2. The sunshade of claim 1 comprised of between about 8 and 20 identical panels, each having a width between about 2 and 5 inches, and a length measured between said side edges of between about 15 and 40 inches.

3. The sunshade of claim 1 comprised of two halves which together provide a length up to 80 inches.

4. The sunshade of claim 1 wherein said lowermost panel is adapted to lie outside said compact stack in said storage state, thereby permitting the sunshade to remain in installed association with a window of said vehicle.

* * * * *